United States Patent [19]

Fischnaller et al.

[11] Patent Number: 5,713,811
[45] Date of Patent: Feb. 3, 1998

[54] DIFFERENTIAL DRIVE WITH DIFFERENTIAL GEARS HAVING SPHERICAL BEARING JOURNALS

[75] Inventors: Bernhard Fischnaller; Paul Rungger, both of Bruneck, Italy

[73] Assignee: GKN Birfield AG, Bruneck, Italy

[21] Appl. No.: 634,781

[22] Filed: Apr. 19, 1996

[30] Foreign Application Priority Data

Jul. 21, 1995 [IT] Italy .................. MI95A1583

[51] Int. Cl.⁶ .................................. F16H 48/10
[52] U.S. Cl. ........................... 475/252; 475/344
[58] Field of Search ..................... 475/248, 252, 475/344

[56] References Cited

U.S. PATENT DOCUMENTS

| | | |
|---|---|---|
| 799,778 | 9/1905 | Cullman . |
| 2,749,778 | 6/1956 | Kuhn .................. 475/344 |
| 4,012,968 | 3/1977 | Kelbel . |
| 4,224,838 | 9/1980 | Roushdy . |
| 4,836,051 | 6/1989 | Guimbretiere . |
| 4,905,808 | 3/1990 | Tomita et al. . |
| 4,966,268 | 10/1990 | Asano et al. . |
| 5,007,885 | 4/1991 | Yamamoto et al. . |
| 5,012,908 | 5/1991 | Kobayashi et al. . |
| 5,031,743 | 7/1991 | Morishita et al. . |
| 5,036,963 | 8/1991 | Murata . |
| 5,056,640 | 10/1991 | Yamamoto . |
| 5,063,738 | 11/1991 | Asano et al. . |
| 5,070,975 | 12/1991 | Tanaka et al. . |
| 5,080,187 | 1/1992 | Asano et al. . |
| 5,129,870 | 7/1992 | Pierce . |
| 5,197,583 | 3/1993 | Sakai et al. . |
| 5,261,862 | 11/1993 | Pierce . |
| 5,267,916 | 12/1993 | Beim et al. . |

FOREIGN PATENT DOCUMENTS

| | | |
|---|---|---|
| 347165 | 12/1989 | European Pat. Off. . |
| 639730 | 8/1994 | European Pat. Off. . |
| 639730 | 2/1995 | European Pat. Off. . |
| 938813 | 7/1949 | Germany . |
| 3721949 | 1/1988 | Germany . |
| 4103054 | 8/1991 | Germany . |
| 1472489 | 10/1975 | United Kingdom . |

*Primary Examiner*—Dirk Wright
*Attorney, Agent, or Firm*—Dinnin & Dunn, P.C.

[57] ABSTRACT

A differential drive including a differential carrier which is rotatably supported in a drive housing. The drive housing receives two coaxial axle shaft gears and two sets of axis parallel differential gears. The differential gears include a toothed portion and bearing journals which are supported in bearing bores. The bearing journals have bearing faces which are continuously curved so as to be barrel-shaped.

12 Claims, 5 Drawing Sheets

DIFFERENTIAL DRIVE WITH DIFFERENTIAL GEARS HAVING SPHERICAL BEARING JOURNALS

BACKGROUND OF THE INVENTION

The invention relates to a differential drive comprising a differential carrier which is rotatably supported in a drive housing and in which there are received two coaxial axle shaft gears and two sets of axis-parallel differential gears, with each one of the axle shaft gears meshing with one set of the differential gears and each of the differential gears of the one set meshing with at least one of the differential gears of the other set and with the differential gears each comprising a toothed portion and bearing journals which adjoin same at both ends and which are supported in bearing bores in the differential carrier. Differential gears of the above type are known from U.S. Pat. No. 799 778 for example; they are characterized by the simple design of the differential carrier and of the gear sets. The axle shaft gears and differential gears may be spur gears or helical gears. Because the axle shaft gears are supported on bearing journals, the slip limiting value of such differentials is low, which is advantageous for certain applications.

If differentials of this type are optimized towards a small radial diameter, it is necessary for the axle shaft gears and differential gears also to comprise a small diameter. To avoid impermissibly high tooth loads at a given torque value, it is necessary for the teeth to be correspondingly long. In consequence, the differential gears become relatively slim, so that at torque peaks, bending of the differential gears cannot be excluded. This has resulted in edge load bearing in the case of the bearing journals and meshing teeth, which may lead to fractures. The extent to which the diameter of the differential drive can be reduced is thus limited.

It is therefore the object of the present invention to design differential gears for differential drives of the initially mentioned type and differential drives provided with such differential gears in such a way that, even with slim differential gears, they are able to withstand short-term peak loads without suffering any damage.

The objective is achieved in that the bearing faces of the bearing journals are continuously curved so as to be barrel-shaped, i.e. they bulge out towards their longitudinal centers, the advantage of such an embodiment being that, in the case of peak loads, resilient bending of the axle shaft gears becomes possible and permissible without any edge load bearing occurring at the bearing journals inside the bearing bores. The bulginess of the bearing journals is to be calculated to be such that at a predetermined torque peak with the resulting differential gear bending, edge load bearing is just avoided. According to a preferred embodiment it is proposed that, in the longitudinal section, the bearing faces of the bearing journals are delimited by the shape of a circular arch, with the greatest distance from the axis of the respective differential gears occurring approximately at half the length of the bearing journals.

A further improvement consists in that the toothed portions of the differential gears, preferably at both ends, extend in a curved way towards the axis of the respective differential gear. In this way, edge load bearing can even be avoided in the region of engagement of the teeth when the differential gears bend under torque peaks. A supplementary improvement consists in that the toothed portions of the axle shaft gears, at least at the respective outwardly of the housing pointing axle ends, extend in a curved way towards the axis of the respective axle shaft gear.

According to a further advantageous embodiment, the journal diameter of a bearing journal directly adjoining the toothed region is greater than the journal diameter of a second bearing journal which is separated by an intermediate journal. In this way, the fact is taken into account that the journals directly adjoining the toothed regions are subjected to higher specific loads as they directly accommodate the forces of engagement with the axle shaft gears.

An additional measure for avoiding edge load bearing in the region of the bearing journals consists in that the bearing bores in the differential carrier widen towards the inner housing face. In particular, it is possible for the bearing bores to continuously widen conically from the outer housing face towards the inner housing face or to widen conically near the inner housing face and to be tapered in a calotte-like way towards the outer housing face so as to be adapted to the journal shape.

Furthermore, the bearing bores may be cylindrical in shape towards the inner housing face and, therefore, to tapered in a calotte-like way towards the outer housing face to be adapted to the bearing journal shape.

The above-mentioned bearing bores may be provided directly in the material of the cover parts or in the material of bearing bushes inserted into larger cylindrical bores in the cover parts.

Finally, it is possible for the bearing bores—if their surfaces are formed in the material of bearing bushes—to taper from a cross-section of the greatest diameter both towards the outer housing face and towards the inner housing face in a calotte-like way for the purpose of being adapted to the journal shape. This makes it necessary for the respective bearing bushes, at their circumferences, to be slotted and to be slid over the barrel-shaped bearing journals before being inserted into the cylindrical bores.

According to a further embodiment, the barrel-shaped surfaces of the bearing journals are provided on bearing rings slid on to cylindrical basic journals of the differential gears.

BRIEF DESCRIPTION OF THE DRAWINGS

A preferred embodiment is described below with reference to the drawings wherein.

(a) in a tangential section;

(b) in a radial section through the first of the two gears, meshing with the associated axle shaft gear;

(c) in a radial section through the second of the two gears, meshing with the associated axle shaft gear.

Figure 5:
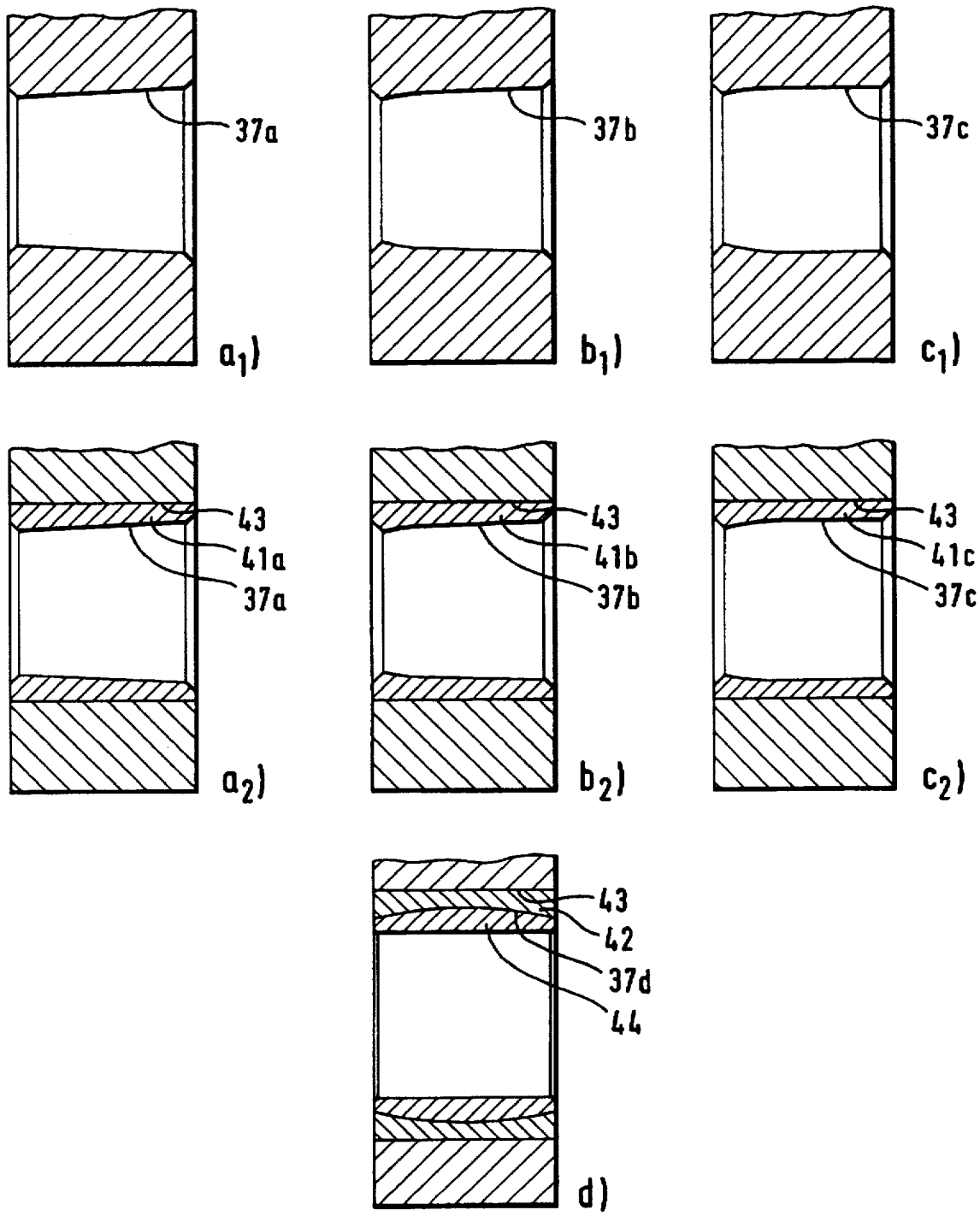

FIG. 5 shows different shapes and designs of bearing bores.

DETAILED DESCRIPTION OF THE PREFERRED EMBODIMENT(S)

Figure 1:
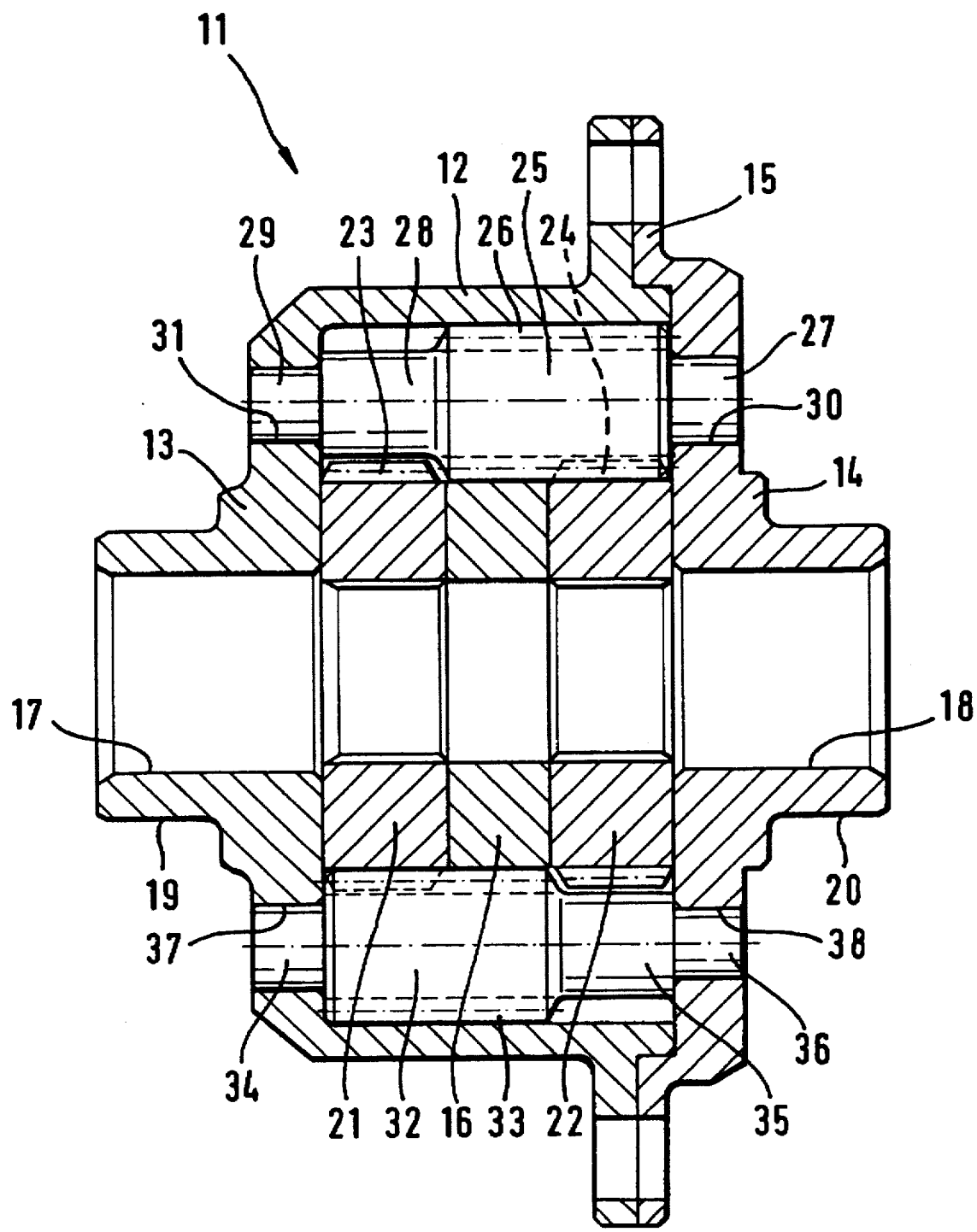
FIG. 1 is a longitudinal section through a differential drive in accordance with the invention which, however, does not show the details in accordance with the invention.

FIG. 1 shows the differential carrier 11 of a differential drive, consisting of a central carrier portion 12 and an integrally formed-on cover 13 and a cover 14 inserted at the other end. At the carrier portion 12 and cover 14 there is provided a flange 15 for flanging on the driving pinion. The cover parts 13, 14 are provided with through-bores 17, 18 for passing through axle shafts, and with bearing seats 19, 20 for slipping on bearing elements by means of which the differential carrier 11 is rotatably supportable in a drive housing (not illustrated). Two axle shaft gears 21, 22 are coaxially received in the differential carrier 11 in a central through-bore. The axle shaft gear 21 comprises teeth 23 and the axle shaft gear 22 comprises teeth 24. A spacing piece 16 is positioned between the two axle shaft gears 21, 22 also in said through-bore. A first differential gear 25 of a first set of differential gears is positioned off-axially and comprises a toothed region 26 which engages the axle shaft gear 22 and which, additionally, extends axially along the length of the spacing piece 16. A first bearing journal 27 supported in a cover bore 30 in the cover 14 directly adjoins the toothed region 26. At the opposed end of the toothed region there is provided an intermediate journal 28 which is followed by a second bearing journal 29 supported in a housing bore 31 in the cover part 13. The diameter of the second bearing journal 29 is smaller than that of the intermediate journal 28 and that of the first bearing journal 27. A second differential gear 32 of a second set of differential gears is identical in design to the first differential gear 25 and arranged symmetrically, but axially opposite, thereto and comprises a toothed region 33 which engages the axle shaft gear 21 and, additionally, axially extends along the length of the spacing piece 16. A first bearing journal 34 supported in a cover bore 37 of the cover 13 directly adjoins the toothed region 33. At the opposed end of the toothed region 33, there is provided an intermediate journal 35 which is followed by a second bearing journal 36 supported in a housing bore 38 in the cover part 14. The diameter of the second bearing journal 26 is smaller than that of the first bearing journal 34 and that of the intermediate journal 35.

Figure 2:
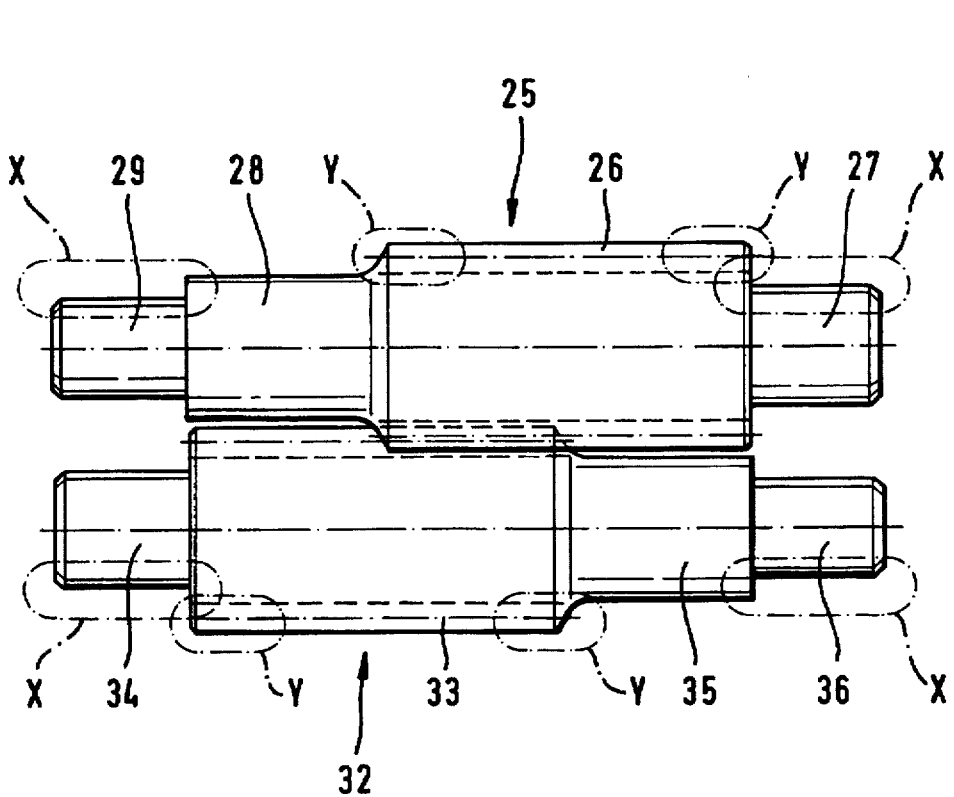
FIG. 2 shows a pair of differential gears in accordance with the invention, with two enlarged details.
Figure 2:
Figure 2:
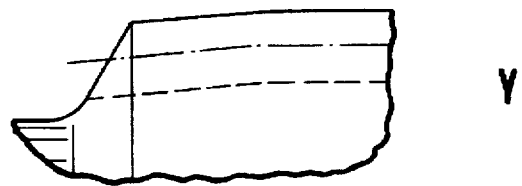

FIG. 2 shows a pair of differential gears 25, 26 in accordance with the invention whose details have already been explained and which have been given the same reference numbers. Between the intermediate journal 28, 35 and the teeth of the respective other differential gear 32, 26, there is provided radial play. The two toothed regions 26, 32 engage one another in an axial region which corresponds to the position and length of the spacing piece 16. In the toothed part extending there beyond, the toothed region 26—see FIG. 1—engages the axle shaft gear 22, and the toothed region 32—see FIG. 1—engages the axle shaft gear 21. The surfaces of the bearing journals 27, 29, 34, 36 are illustrated by the enlarged detail X. It can be seen that the bearing journal comprise barrel-shaped surfaces, i.e. the maximum diameter occurs at half their length and from there on it decreases. In the longitudinal section, the bearing surfaces are delimited by circular arches whose centers of curvature are each positioned beyond the longitudinal axes $Z_1$, $Z_2$. The ends of the toothed regions 26, 33 are illustrated by the enlarged detail Y which shows that, whilst the tooth height remains unchanged, the center lines of the toothed regions at the ends of said toothed regions are curved towards the longitudinal axis $Z_1$, $Z_2$.

Figure 3:
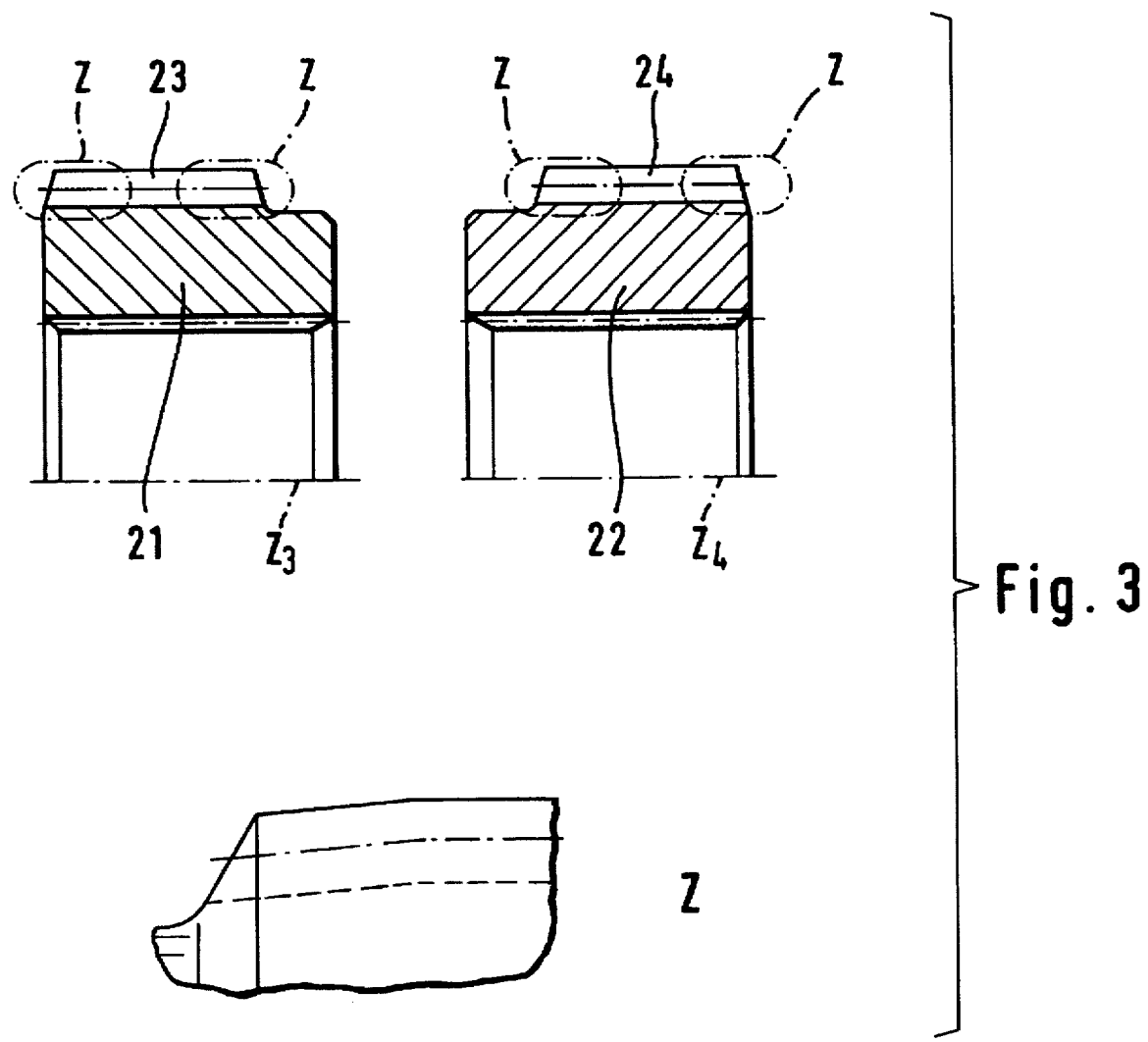
FIG. 3 shows a set of axle shaft gears with an enlarged details.

In FIG. 3, the axle shaft gears 21, 22 are slightly modified as compared to the illustration according to FIG. 1. As far as details are concerned, it is possible to identify the toothed regions 23, 24. The axial distance as shown between the axle shaft gears is occupied by the abovementioned spacing piece. The axial end regions of the toothed regions 23, 24 are shown in the form of the enlarged detail Z. It can be seen that, while the tooth height remains unchanged, the center lines of the toothed regions are curved towards the longitudinal axes $Z_3$, $Z_4$.

Figure 4:
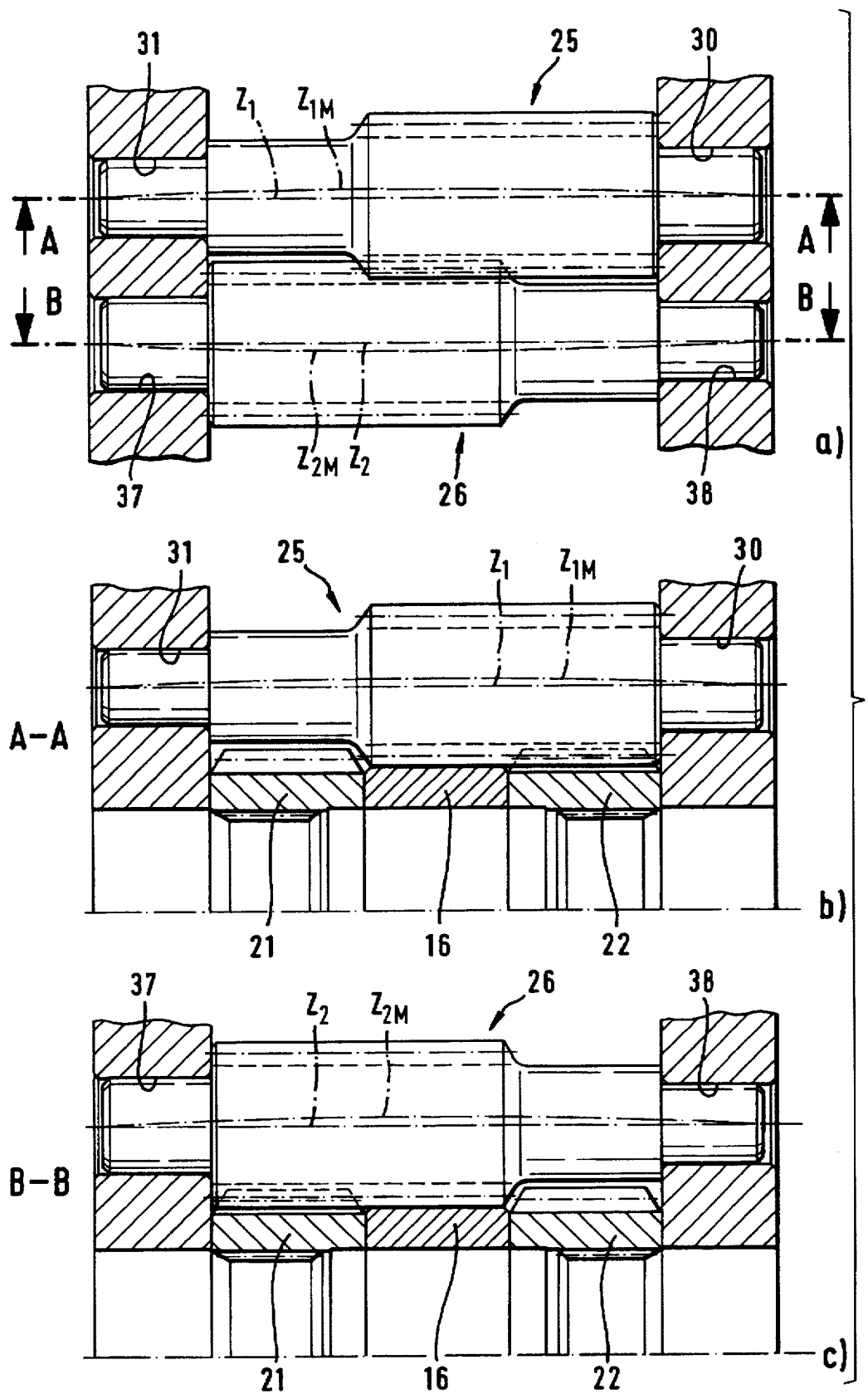
FIG. 4 shows a pair of meshing differential gears supported in the differential carrier, under load.

FIG. 4, in the above-mentioned sections, i.e. the tangential section (a) and radial sections (b,c), shows the pair of differential gears 26, 32 with their bearing regions in the differential carrier 11 engaging one another (a) and engaging the respective associated axle shaft gear 21, 22 (b,c); the respective longitudinal center lines $Z_1$, $Z_2$ in the unloaded condition and $Z_{1M}$, $Z_{1M}$ in the condition of increased tooth load under torque are also shown. The respective center lines are deformed in accordance with the bending curves of a bending beam supported in two points and subjected to a central load. In the present case, the mutual support of the differential gears (a) leads to deformation in the tangential plane (a) and the support of the differential gears on the axle shaft gears leads to deformation in the radial plane (b,c). It can be established quite clearly that the details X, Y of FIG. 2 in accordance with the invention avoid edge load bearing in respect of the bearing journals in the bearing regions 30, 31, 37, 38 as well as edge load bearing in respect of the teeth in the region of the ends of the toothed regions.

FIG. 5 shows different embodiments of bearing bores 37 for the bearing journals 34. In all illustrations, the outer housing face has to be assumed to be to the right of the cover part shown in section, but not indicated and the inner housing face has to be assumed to the left of the cover pan. In FIGS. $a_1$, $b_1$, $c_1$ the bearing bores 37 are formed directly in the cover part and in FIGS. $a_2$, $b_2$, $c_2$ and d, the separate bearing bushes 41, 42 are inserted into smooth through-bores 43 in the cover part.

The bearing bore 37a continuously conically widens towards the inner housing face. The bearing bore 37b conically widens towards the inner housing face from the cross-sectional plane of the greatest journal diameter, whereas a calotte-like taper adapted to the barrel-like journal shape is provided towards the outer housing face.

The bearing bore 37c extends entirely cylindrically from approximately the cross-sectional plane of the greatest journal diameter towards the inner housing face, whereas towards the outer housing face it is provided with a calotte-like taper adapted to the barrel-like journal shape.

In illustration d, the bearing bush 42 is provided with a bearing surface 37d in the form of an inner calotte. In this case, the bearing ring 42 has to be slotted at its circumference. A bearing ring 44 with a barrel-shaped outer surface is inserted into the calotte. The bearing ring and slotted bearing bush have to be joined before the bearing bush 42 is introduced into the cylindrical bore 43. A cylindrical basic journal of a differential gear is inserted into the bearing ring 44 so that the bearing ring 44 forms the barrel-shaped surface of the bearing journal of the differential gear. The bearing ring is preferably slipped on before the bearing ring and bearing bush are inserted into the cover bore.

What is claimed is:

1. A differential drive, comprising:
    a differential carrier which is rotatably supported in a drive housing and in which there are received two coaxial axle shaft gears and two sets of axis-parallel differential gears, with each one of the axle shaft gears having a longitudinal axis and meshing with one set of the differential gears and each of the differential gears of the one set meshing with at least one of the differential gears of the other set; and
    said differential gears each having a longitudinal axis comprising a toothed portion and bearing journals which adjoin same at both ends and which are supported in bearing bores in the differential carrier, wherein bearing faces of the bearing journals are continuously curved so as to be barrel-shaped.

2. A differential drive according to claim 1, wherein a longitudinal section, the bearing faces of the bearing journals are delimited by a shape of a circular arch and that a greatest axial distance from the axis of the respective differential gear occurs approximately at half a length of the bearing journals.

3. A differential drive according to claim 1, wherein toothed portions of the differential gears, at least at one, preferably at both their axial ends, extend in a curved way towards the axis of the respective differential gear.

4. A differential drive according to claim 1, wherein toothed portions of the axle shaft gears, at least at the respective outwardly pointing axial ends, extend in a curved way towards the axis of the respective axle shaft gear.

5. A differential drive according to claim 1, wherein a journal diameter of a bearing journal directly adjoining a toothed region is greater than the journal diameter of a second bearing journal separated from the toothed region by an intermediate journal.

6. A differential drive according to claim 1, wherein the bearing faces of the bearing journals are provided on bearing rings slid over cylindrical basic journals of the differential gears.

7. A differential drive according to claim 1, wherein the bearing bores in the differential carrier widen towards an inner housing face.

8. A differential drive according to claim 7, wherein the bearing bores widen conically towards the inner housing face.

9. A differential drive according to claim 1, wherein the bearing bores in the differential carrier taper in a calotte-like way approximately from a cross-section of a greatest journal diameter towards the housing outer face.

10. A differential drive according to claim 1, wherein surfaces of the bearing bores are provided in bearing bushes inserted into cylindrical housing bores.

11. A differential drive according to claim 10, wherein the bearing bushes are slotted at their circumferences.

12. A differential drive according to claim 11, wherein the bearing bushes on their insides, taper in a calotte-like way towards both ends approximately from a cross-section of a greatest journal diameter.

* * * * *

UNITED STATES PATENT AND TRADEMARK OFFICE
CERTIFICATE OF CORRECTION

PATENT NO.   : 5,713,811
DATED        : February 3, 1998
INVENTOR(S)  : Bernhard Fischnaller; Paul Rungger It is certified that error appears in the above-identified patent and that said Letters Patent is hereby corrected as shown below:

Column 1, Line 46, delete "axle shaft gears" replace with -- differential gears --
Column 4, Line 26, delete "pan" replace with -- part --
Column 5, Claim 2, Line 2 delete "beating" replace with -- bearing --
Column 5, Claim 2, Line 2 delete "beating" replace with -- bearing --
Column 5, Claim 2, Line 5 delete "a" replace with -- the --

Signed and Sealed this

Twenty-eighth Day of July, 1998

Attest:

BRUCE LEHMAN

*Attesting Officer*          Commissioner of Patents and Trademarks

UNITED STATES PATENT AND TRADEMARK OFFICE
CERTIFICATE OF CORRECTION

PATENT NO. : 5,713,811
DATED : February 3, 1998
INVENTOR(S) : Bernhard Fischnaller; Paul Rungger It is certified that error appears in the above-identified patent and that said Letters Patent is hereby corrected as shown below:

On the title page item [73], replace "GKN Birfield AG" with --GKN Viscodrive GmbH--

Signed and Sealed this

Seventeenth Day of August, 1999

Attest:

Q. TODD DICKINSON

Attesting Officer   Acting Commissioner of Patents and Trademarks